Patented May 3, 1932

1,856,217

UNITED STATES PATENT OFFICE

GEORG KALISCHER AND RUDOLF SCHUELE, OF FRANKFORT-ON-THE-MAIN, AND HANS SCHINDHELM, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

WOOL AZO DYESTUFFS AND PROCESS OF MAKING SAME

No Drawing. Application filed September 11, 1930, Serial No. 481,346, and in Germany September 17, 1929.

Our present invention relates to new acid wool dyestuffs and to a process of making same.

These dyestuffs correspond to the general formula

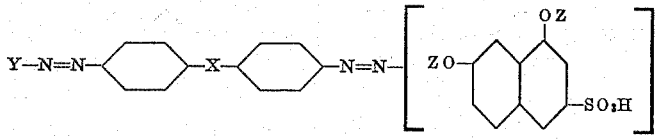

(wherein X means $>CH_2$ or $>C(CH_3)_2$ or

Y means any combining component and the Z's means hydrogen atoms which may be partially replaced by

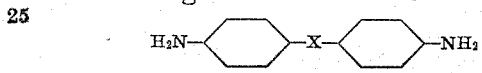

and wherein all benzene nuclei may contain further substituents). They are obtained by tetrazotizing a diamine of the formula

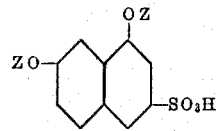

(wherein X has the aforesaid signification and accordingly the benzene nuclei may contain further substituents) and combining the tetrazo compounds thus formed with 2 molecular proportions of combining components, at least one of which is of the formula (wherein Z has the above signification).

The present dyestuffs are distinguished by valuable shades, a remarkable fastness to light and other properties fulfilling high practical requirements. This fact is the more surprising since 2.8-dihydroxy-napthalene-6-sulfonic acid used as combining component was hitherto of no industrial importance for the production of fast acid wool dyestuffs.

The favorable action of 2.8-dihydroxy-naphthalene-6-sulfonic acid appears already if one residue of this acid is present in the molecule of the dyestuffs which are prepared in this case with the formation of a corresponding intermediate compound.

Those of the present dyestuffs which contain no aryl sulfo groups may be after treated with arylsulfochlorides and yield thereby esterified dyestuffs.

These latter dyestuffs show a likely good fastness and in some cases clearer and more yellowish shades than the original dyestuffs.

The tetrazo compounds used for the production of these dyestuffs are that of 4.4'-diamino - diphenyl - methane, 4.4'-diamino-triphenyl-methane, 4.4'-diamino-diphenyl-dimethyl-methane or nuclear substitution products of these compounds.

In order to further illustrate our invention the following examples are given, the parts being by weight and all temperatures in centigrade degrees, but we wish it to be understood that we are not limited to the particular products nor reaction conditions mentioned therein:

Example 1

22.6 parts of 4.4'-diamino-diphenyl-dimethylmethane (obtained according to U. S. Patent No. 1,525,738) are dissolved in about 200 parts of water and 70 parts of hydrochloric acid (specific gravity=1.15) and transformed into the tetrazo-compound in the customary manner by the addition of 13.8 parts of sodium nitrite, the temperature being maintained at nearly 0° by the addition of ice. The tetrazo solution is added to a solution of 52.4 parts of the sodium salt of 2.8-dihydroxy-naphthalene-6-sulfonic acid containing an amount of sodium carbonate or bicarbonate sufficient for maintaining a feebly alkaline reaction until the formation of the dyestuff has been finished. After some hours the dyestuff is isolated in the usual way by filtering and drying.

It corresponds to the probable formula

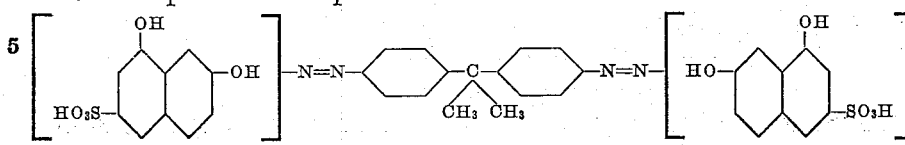

It dyes wool red shades of very good fastness to washing and light.

The concentrated solution of this dyestuff is warmed with para-toluene-sulfochloride with the addition of carbonate of sodium or of caustic soda solution.

The new esterified dyestuff thus obtained dyes very bright yellowish red shades of the same good fastness, also to milling, perspiration and sea-water.

A similar product is obtained by using as

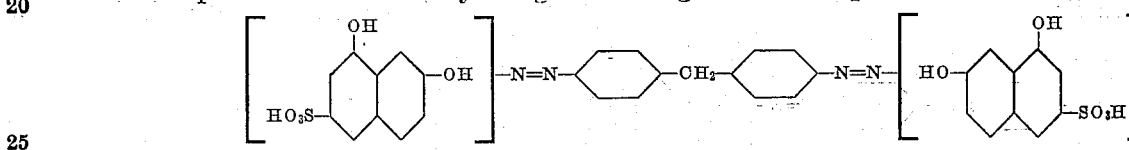

combining component the mono-benzene-sulfonic acid ester of 2.8-dihydroxy-naphthalene-6-sulfonic acid.

*Example 2*

28.6 parts of 4.4'-diamino-3.3'-dimethoxy-diphenyl-dimethylmethane (prepared according to U. S. Patent No. 1,525,738) are dissolved in 200 parts of water and 70 parts of hydrochloric acid of specific gravity 1.15 and tetrazotized at 0° with 13.8 parts of nitrite. Then sodium carbonate or bicarbonate is added until the solution shows a feebly alkaline reaction and the mass is allowed to run slowly while stirring into a solution of 51.7 parts of the sodium salt of 1-toluene-sulfamino - 8 - hydroxy-napthalene-3.6-disulfonic acid. Thereby an intermediate body is formed which may be precipitated by the addition of common salt. By adding it to a solution of 26.2 parts of the sodium salt of 2.8-dihydroxy-naphthalene-6-sulfonic acid a bright bluish claret red dyestuff is obtained distinguished by a very good fastness to washing, milling and light.

The dyestuff thus produced corresponds to the probable formula

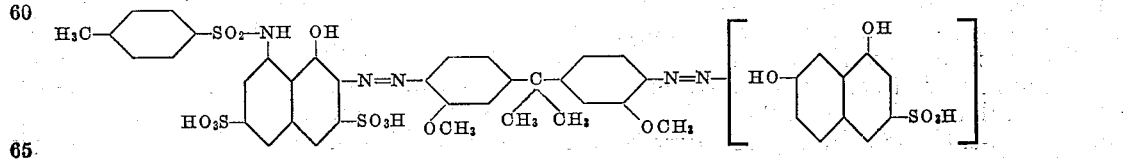

*Example 3*

19.8 parts of 4.4'-diamino-diphenyl-methane are tetrazotized in the customary manner by means of 13.8 parts of nitrite at a temperature not essentially exceeding 0°. The tetrazo-compound is introduced while stirring into a solution maintained at 0°, of 52.4 parts of the sodium salt of 2.8-dihydroxy-naphthalene-6-sulfonic acid and about 45 parts of calcined soda. The formed dyestuff is isolated as usual by precipitating with common salt, filtering and drying. It dyes wool red shades of good fastness to washing and light. It corresponds to the formula

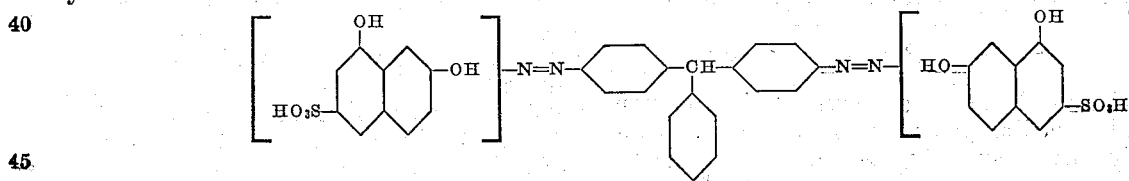

By treating the concentrated hot solution of it with para-toluene-sulfochloride and alkali, a dyestuff of an essentially brighter shade and of the same fastness is obtained.

*Example 4*

When in Example 3 diamino-diphenyl-methane is replaced by 27.4 parts of 4.4'-diamino-triphenylmethane and the process is otherwise carried out in the same way, a red dyestuff of a good fastness to washing and light is obtained. It corresponds to the formula

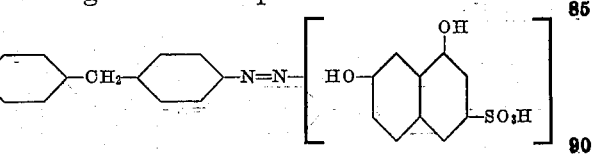

It may also be esterified in a hot alkaline solution with para-toluene-sulfochloride. Thereby a much brighter and more yellowish dyestuff of a very good fastness is obtained.

We claim:
1. Process which comprises tetrazotizing a diamine of the general formula

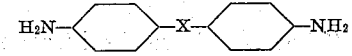

(wherein X means $>CH_2$ or $>C(CH_3)_2$ or

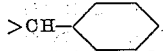

and all benzene nuclei may be substituted by

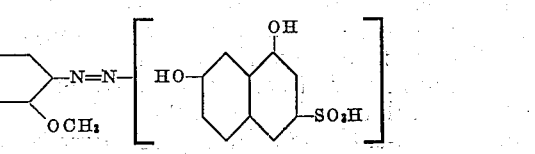

alkyl or alkoxy groups), combining the tetrazo compound thus produced with 2 molecules of combining components, at least one of which is 2.8-dihydroxy-naphthalene-6-sulfonic acid of the formula

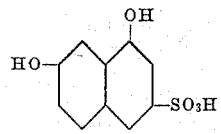

and causing an arylsulfochloride of the benzene series to react on the alkaline solution of the formed dyestuffs.

2. Process which comprises tetrazotizing a diamine of the general formula

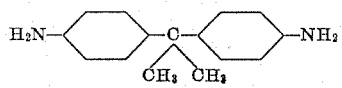

combining the tetrazo compound thus produced with 2 molecules of 2.8-dihydroxy-naphthalene-6-sulfonic acid of the formula

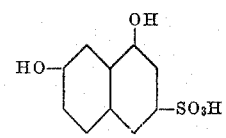

and causing an aryl-sulfochloride of the benzene series to react on an alkaline solution of the formed dyestuffs.

3. Process which comprises tetrazotizing a diamine of the general formula

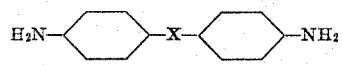

(wherein X means $>CH_2$ or $>C(CH_3)_2$ or $$>CH-\bigcirc$$

and all benzene nuclei may be substituted by alkyl or alkoxy groups), combining the tetrazo compound thus produced with 2 molecules of combining components, at least one of which is 2.8-dihydroxy-naphthalene-6-sulfonic acid of the formula

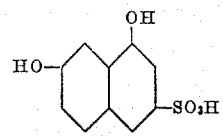

4. Process which comprises tetrazotizing a diamine of the general formula

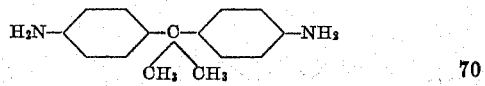

combining the tetrazo compound thus produced with 2 molecules of 2.8-dihydroxy-naphthalene-6-sulfonic acid of the formula

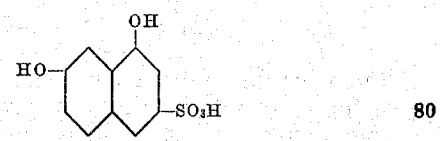

5. As new compounds the acid wool dyestuffs of the general formula

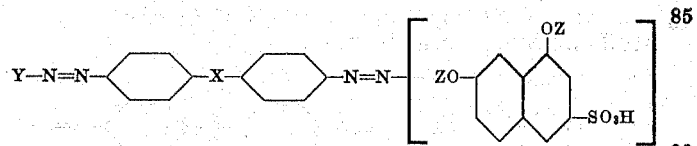

(wherein X means $>CH_2$ or $>C(CH_3)_2$ or $$>CH-\bigcirc,$$

Y means any combining component and the Z's mean hydrogen atoms which may be partially replaced by

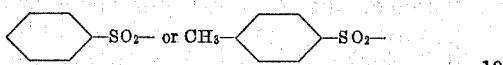

and wherein all benzene nuclei may be substituted by alkyl or alkoxy groups), which compounds represent when dry colored powders dyeing wool from an acid bath different shades of a very good fastness especially to light.

6. As new compounds the acid wool dyestuffs of the general formula

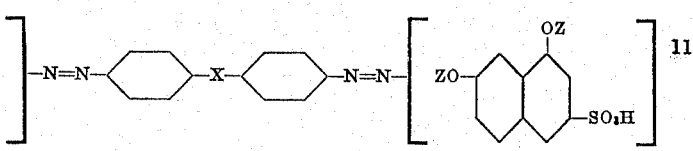

(wherein X means $>CH_2$ or $>C(CH_3)_2$ or $$>CH-\bigcirc$$

and the Z's mean hydrogen atoms which may be partially replaced by

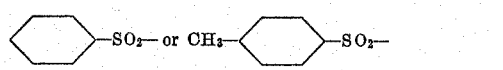

and wherein all benzene nuclei may be substituted by alkyl or alkoxy groups) which compounds represent when dry colored powders dyeing wool from an acid bath reddish shades of a very good fastness especially to light.

7. As new compounds the acid wool dyestuffs of the general formula

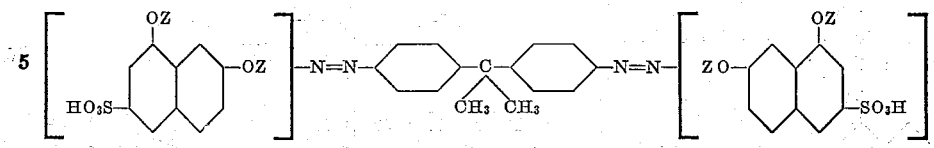

(wherein the Z's mean hydrogen atoms which may be partially replaced by

and wherein all benzene nuclei may be substituted by alkyl or alkoxy groups) which compounds represent when dry colored powders dyeing wool from an acid bath reddish shades of a very good fastness especially to light.

8. As new compounds the acid wool dyestuffs of the general formula

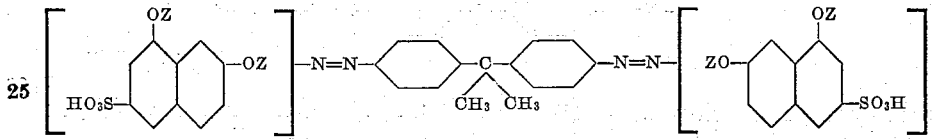

(wherein the Z's mean hydrogen atoms which are partially replaced by

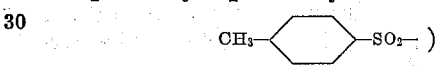

which compounds represent when dry colored powders dyeing wool from an acid bath reddish shades of a very good fastness especially to light.

In testimony whereof, we affix our signatures.

GEORG KALISCHER.
RUDOLF SCHUELE.
HANS SCHINDHELM.